United States Patent
Mana et al.

(10) Patent No.: US 8,449,021 B2
(45) Date of Patent: May 28, 2013

(54) VEHICLE LOWER-LEG PROTECTION DEVICE AND METHOD OF MAKING AND USING THE SAME

(75) Inventors: Dinesh Mana, Bangalore (IN); Somasekhar Venkat Bobba, Bangalore (IN); Dhanendra Kumar Nagwanshi, Bangalore (IN); Matthew Douglas Marks, Waterford, MI (US)

(73) Assignee: SABIC Innovative Plastics IP B.V. (NL)

( * ) Notice: Subject to any disclaimer, the term of this patent is extended or adjusted under 35 U.S.C. 154(b) by 17 days.

(21) Appl. No.: 12/970,989

(22) Filed: Dec. 17, 2010

(65) Prior Publication Data

US 2012/0153643 A1 Jun. 21, 2012

(51) Int. Cl.
*B60R 21/34* (2011.01)

(52) U.S. Cl.
USPC ........................ 296/187.04; 293/132; 293/120

(58) Field of Classification Search
USPC ............. 296/187.04, 184.03, 187.09, 187.01; 293/120, 132, 121, 133
IPC ....................................................... B60R 19/12
See application file for complete search history.

(56) References Cited

U.S. PATENT DOCUMENTS

| | | | |
|---|---|---|---|
| 6,290,272 B1 * | 9/2001 | Braun ........................... | 293/120 |
| 6,513,843 B1 | 2/2003 | Frederick et al. | |
| 6,540,275 B1 | 4/2003 | Iwamoto et al. | |
| 6,866,331 B2 | 3/2005 | Kropfeld | |
| 6,893,064 B2 * | 5/2005 | Satou ............................. | 293/132 |
| 7,044,514 B2 | 5/2006 | Mustafa et al. | |
| 7,163,243 B2 | 1/2007 | Evans | |
| 7,222,896 B2 | 5/2007 | Evans | |
| 7,434,872 B2 | 10/2008 | Steller | |
| 7,438,348 B2 * | 10/2008 | Nakamae et al. ........ | 296/187.04 |
| 7,441,828 B2 * | 10/2008 | Noyori et al. ............. | 296/187.04 |
| 7,481,484 B2 | 1/2009 | Hirano | |
| 7,516,994 B2 | 4/2009 | Ito | |
| 7,597,383 B2 | 10/2009 | Itou et al. | |
| 7,607,720 B2 | 10/2009 | Noyori et al. | |
| 7,699,383 B2 * | 4/2010 | Fukukawa et al. ....... | 296/187.04 |
| 7,699,393 B2 | 4/2010 | Forbes et al. | |
| 7,806,448 B2 | 10/2010 | Allen et al. | |

(Continued)

FOREIGN PATENT DOCUMENTS

EP 1300293 A9 4/2003
EP 1433664 A2 6/2004

(Continued)

OTHER PUBLICATIONS

Japanese Patent No. 2002274298 (A); Publication Date: Sep. 25, 2002; Abstract Only; 1 Page.

(Continued)

*Primary Examiner* — Glenn Dayoan
*Assistant Examiner* — Pinel Romain
(74) *Attorney, Agent, or Firm* — Cantor Colburn LLP

(57) ABSTRACT

In one embodiment, a thermoplastic lower-leg device, comprises: corrugations in a direction perpendicular to an impact direction; and an interior section extending in the impact direction and having an outbound portion having an outbound length $D_1$ extending at an angle, $\alpha_1$, from the interior section and an inbound portion having an inbound length, $D_2$, extending in a direction opposite the outbound portion at an angle, $\alpha_2$, from the interior section.

19 Claims, 10 Drawing Sheets

U.S. PATENT DOCUMENTS

| | | | |
|---|---|---|---|
| 8,042,847 B2* | 10/2011 | Garg et al. | 293/102 |
| 2003/0067179 A1 | 4/2003 | Bastien et al. | |
| 2007/0284915 A1 | 12/2007 | Hasegawa et al. | |
| 2009/0115205 A1* | 5/2009 | Steller et al. | 293/115 |
| 2009/0134641 A1* | 5/2009 | Noyori et al. | 293/110 |
| 2009/0160203 A1 | 6/2009 | Garg et al. | |
| 2009/0267369 A1 | 10/2009 | Hasegawa et al. | |

FOREIGN PATENT DOCUMENTS

| | | |
|---|---|---|
| EP | 1813485 A1 | 8/2007 |
| EP | 1867525 A2 | 12/2007 |
| JP | 2002274298 A | 9/2002 |
| JP | 2006247237 A | 9/2006 |
| WO | 2006008137 A1 | 1/2006 |

OTHER PUBLICATIONS

Japanese Patent No. 2006247237 (A); Publication Date: Sep. 21, 2006; Abstract Only; 1 Page.

Dr. Sabine Philipp; "Pedestrian Protection on a Broad Front"; BASF, The Chemical Company; Mar. 18, 2010; 2 Pages.

International Search Report; International Application No. PCT/US2011/064206, International Filing Date: Dec. 9, 2011; Date of Mailing: Dec. 16, 2012; 5 Pages.

Written Opinion of the International Searching Authority; International Application No. PCT/US2011/064206, International Filing Date: Dec. 9, 2011; Date of Mailing: Dec. 16, 2012; 4 Pages.

* cited by examiner

VEHICLE LOWER-LEG PROTECTION DEVICE AND METHOD OF MAKING AND USING THE SAME

BACKGROUND

The present disclosure relates generally to energy absorbers for use in a vehicle, and especially to lower-leg protection devices.

A challenge for design engineers in the automotive market is pedestrian safety, e.g., controlling the knee bending. Traditionally and the most commonly used solution with respect to lower-leg protection is the metal spoilers (e.g., tubes) or a leg-spoiler which extends below bumper beam (e.g., U.S. Pat. No. 6,513,843 B1 to Frederick et al. for a Pedestrian Protection Leg Spoiler). These solutions, although very simple, can be heavy and therefore are not usually preferred by the automobiles original equipment manufacturers (OEMs). Other inherent disadvantages of these metal spoilers include non-uniform stiffness across the vehicle width, limitations in the geometry and shape of the component, insufficient deformation in the impact direction, and relatively higher stiffness than desired. These disadvantages add to the difficulty of using metal for such a solution. Moreover, use of a separate cover over the bottom portion of the vehicle to protect from rocks, dirt, and the like, cannot be avoided if metal spoilers are used.

A second solution comprises a simple plastic sheet/tray (undertray). Although this solution prevents stone and other components from chipping the inside of the vehicle engine compartment, it requires very high or often impossible mold thickness to achieve the required amount of stiffness. Therefore, the tray is a heavy, inefficient, and not a cost effective solution for lower-leg protection.

A third solution relates to complex, injection molded designs that use a lower bumper stiffener. These are again not observed to be very efficient, lightweight and cost effective solutions because of their complex geometric configurations and high thickness and mass. In addition to the issues of weight and mass, a further disadvantage of all of these solutions is that they move very little in the impact direction.

Hence, there is a need for a lower-leg device having a reduced weight compared to current solutions, and being capable of moving in the impact direction.

BRIEF SUMMARY

Disclosed herein are thermoplastic lower-leg devices, methods and systems for making and using the same.

In one embodiment, a thermoplastic lower-leg device can comprise: corrugations in a direction perpendicular to an impact direction; and an interior section extending in the impact direction and having an outbound portion having an outbound length $D_1$ extending at an angle, $\alpha_1$, from the interior section and an inbound portion having an inbound length, $D_2$, extending in a direction opposite the outbound portion at an angle, $\alpha_2$, from the interior section.

In one embodiment, a vehicle can comprise: a radiator located behind a bumper beam, an energy absorbing system comprising an energy absorber having crush lobes located in front of the bumper beam, a lower-leg device, and a fascia over the energy absorbing system and the lower-leg device. The lower-leg device can comprise: corrugations in a direction perpendicular to an impact direction; and an interior section extending in the impact direction and having an outbound portion having an outbound length $D_1$ extending at an angle, $\alpha_1$, from the interior section and an inbound portion having an inbound length, $D_2$, extending in a direction opposite the outbound portion at an angle, $\alpha_2$, from the interior section.

These and other non-limiting features and characteristics are more particularly described below.

BRIEF DESCRIPTION OF THE DRAWINGS

The following is a brief description of the drawings wherein like elements are numbered alike and which are presented for the purposes of illustrating the exemplary embodiments disclosed herein and not for the purposes of limiting the same.

DETAILED DESCRIPTION

Figure 2:
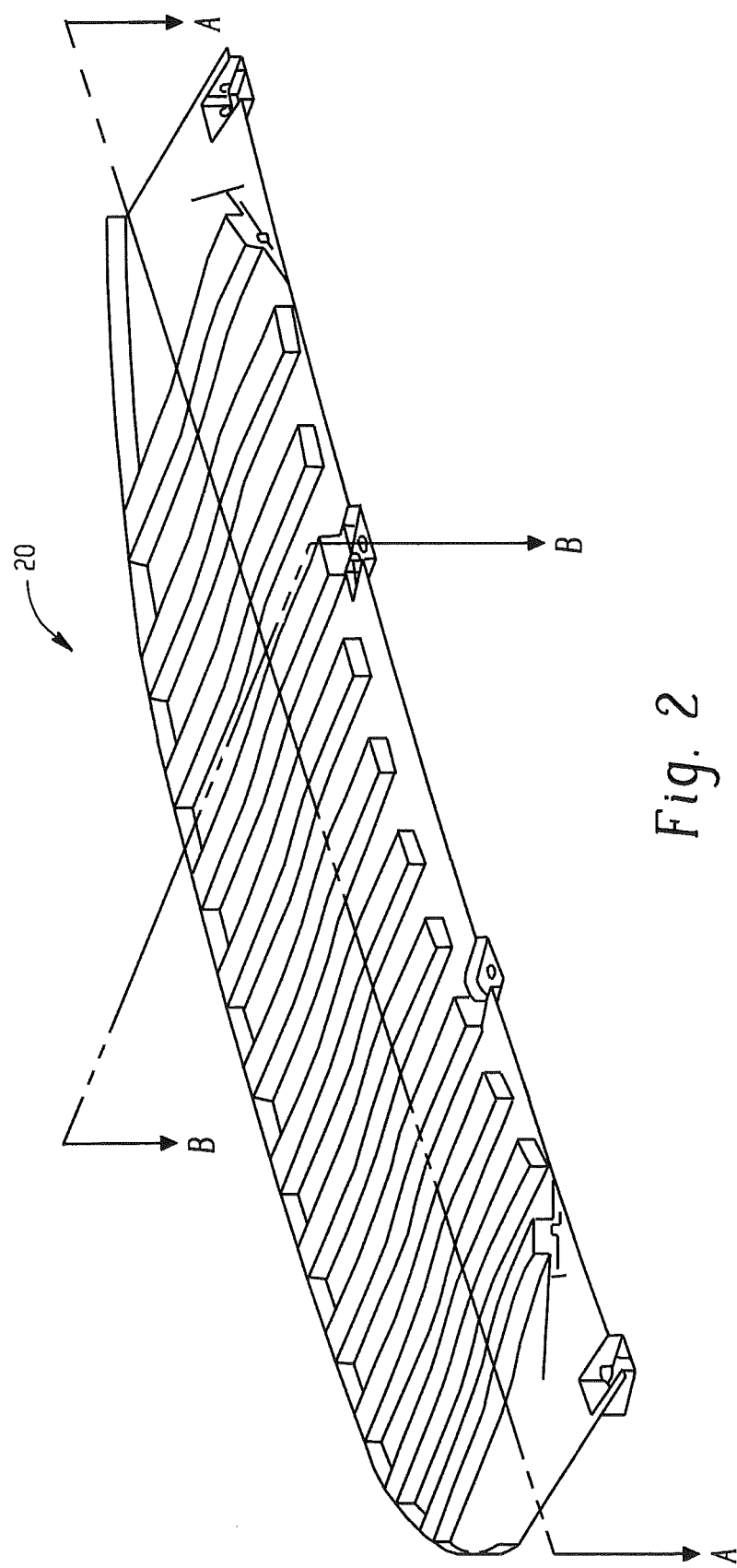
FIG. 2 is a prospective top view of an embodiment of a lower-leg device.

The present design is a lightweight, efficient, and lower-leg protector for automobiles (Refer to FIG. 2). The lower-leg protector with corrugated profile across the width of the vehicle offers high strength to mass ratio, with the corrugations serving as air guides for the free flow of cooling air (Refer to FIG. 3). The design further enables a spring back effect; a push back (Refer to FIG. 5) by deflection the desired amount along the impact direction without undergoing permanent failure. Finally, the lower-leg device can, optionally, completely rap around the vehicle bumper fascia to prevent stone and other unwanted components from chipping inside the vehicle, thereby preventing damage to the radiator, engine, and other bumper components.

Disclosed herein, in various embodiments, are vehicle lower-leg protection devices. Injuries to a pedestrian during a pedestrian-vehicle impact can be generally classified into two broad categories. The first category signifies the damage to pedestrian leg while the second one refers the damage to the head. The leg injury is mainly due to the impact of pedestrian leg with stiffer portions of the vehicle before the required amount of energy is absorbed. The current lower-leg device provides a solution to this category, e.g., where the pedestrian knee experiences high deceleration/force values, high bending, and high shear between the top and the bottom portion of the leg. The disclosed design can significantly reduce knee bending, and also help to reduce the force experienced by the leg by absorbing energy during the first impact of the vehicle with the pedestrian leg. Hence, the proposed design in conjunction with energy in some cases, when assembled over the vehicle is capable of meeting pedestrian-safety impact requirements (e.g., European Enhanced Vehicle-safety Committee (EEVC), European Automobile Manufacturers' Association (ACEA,) Phase II and, and Global Technical Regulations (GTR)) along with the low-speed vehicle to barrier damageability requirements (e.g., United Nations Economic Commission for Europe (e.g., ECE-42)). Unlike steel tubes/spoilers, the present lower-leg device is capable of meeting pedestrian impact regulations with the proposed/upcoming Flexible Pedestrian (Flex-Pli) legform impactors where the force and the strain levels are measured at each and every location of the leg. This impactor represents a 50th percentile male leg, which is struck from the right side. The Flex PLI (Flexible Pedestrian Legform Impactor) simulates the flexible nature of the human bone. It is fired from a linear guide into the bumper of a static vehicle at 40 kilometers per hour (km/hr or kmph) for the assessment of pedestrian lower leg and knee injuries.

The lower-leg device can comprise any thermoplastic material or combination of thermoplastic materials with another material (e.g., with elastomeric materials and/or thermoset materials), such as a filled thermoplastic polyolefin (TPO). Possible thermoplastic materials include polybutylene terephthalate (PBT); acrylonitrile-butadiene-styrene (ABS); polycarbonate; polycarbonate/PBT blends; polycarbonate/ABS blends; copolycarbonate-polyesters; acrylic-styrene-acrylonitrile (ASA); acrylonitrile-(ethylene-polypropylene diamine modified)-styrene (AES); phenylene ether resins; blends of polyphenylene ether/polyamide; polyamides; phenylene sulfide resins; polyvinyl chloride PVC; high impact polystyrene (HIPS); low/high density polyethylene (L/HDPE); polypropylene (PP); expanded polypropylene (EPP); and thermoplastic olefins (TPO), as well as filled (e.g., glass filled) materials of above resins. For example, lower-leg device and, optionally the energy absorber, comprise Xenoy® resin, which is commercially available from SABIC Innovative Plastics IP B.V. An exemplary filled resin is STAMAX® resin, which is a long glass fiber filled polypropylene resin also commercially available from SABIC Innovative Plastics IP B.V. The bumper beam, energy absorber, and/or crash cans can also be formed from combinations comprising at least one of any of the above-described materials.

A more complete understanding of the components, processes, and apparatuses disclosed herein can be obtained by reference to the accompanying drawings. These figures (also referred to herein as "FIG.") are merely schematic representations based on convenience and the ease of demonstrating the present disclosure, and are, therefore, not intended to indicate relative size and dimensions of the devices or components thereof and/or to define or limit the scope of the exemplary embodiments. Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

Figure 1:
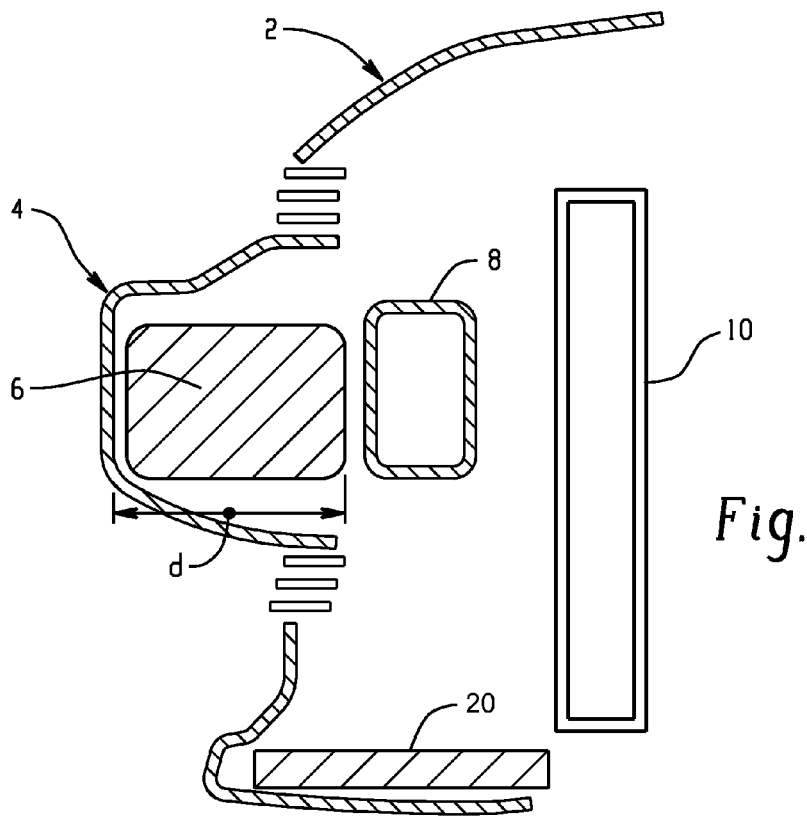
FIG. 1 is a cross-sectional, schematic view, taken along the impact direction, of a front end of a vehicle with an energy absorber and a lower-leg device.
Figure 3:
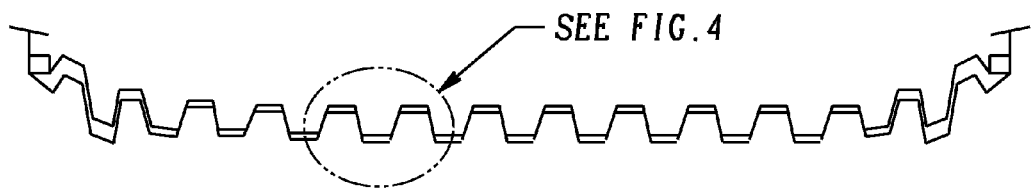
FIG. 3 is a cross-sectional view of the lower-leg device taken along lines A-A of FIG. 2.
Figure 5:
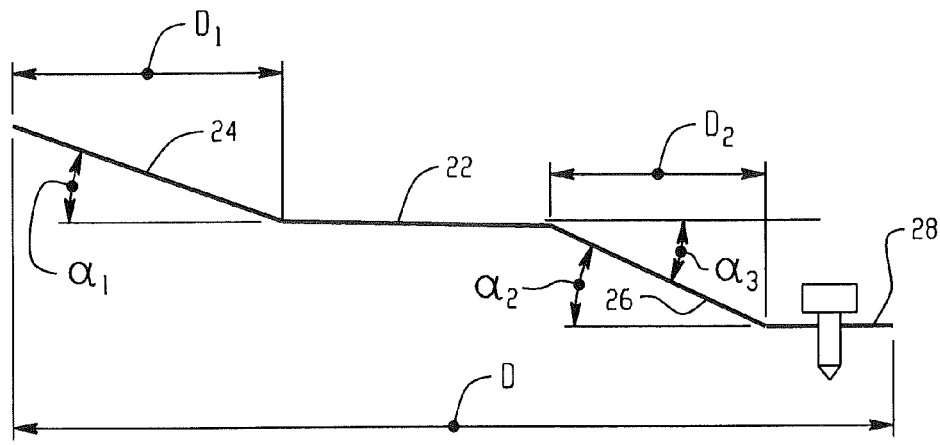
FIG. 5 is a cross-sectional view of the lower-leg device taken along lines B-B of FIG. 2, along the impact direction.

FIG. 1 is a schematic, cross-sectional, partial view of one embodiment of a front end of a vehicle comprising a bumper beam 8, energy absorber (EA) 6, fascia 4, hood 2, radiator 10, and a lower-leg device 12. FIG. 2 is an exemplary embodiment of a lower-leg device 20. FIGS. 3 and 5 are cross-sectional views of the lower-leg device of FIG. 2 taken along lines A-A and B-B respectively.

In one embodiment, a thermoplastic lower-leg device comprises multi-level corrugations. For example, the device can comprise: corrugations in a direction perpendicular to an impact direction (e.g., in the direction from A to A in FIG. 2); an interior section 22 extending in the impact direction (e.g., in direction from B to B of FIG. 2) and having an outbound portion 24 having an outbound length $D_1$ extending at an angle, $\alpha_1$, from the interior section 22 and an inbound portion 26 having an inbound length, $D_2$, extending in a direction opposite the outbound portion 24 at an angle, $\alpha_2$, from the interior section 22. (See FIG. 5) In various embodiments, the angles $\alpha_1$, $\alpha_2$ can be, independently, greater than zero and less than 90 degrees. Furthermore, the outbound portion, interior section, and inbound portion can be at multiple levels. For example, the outbound section 24 can extend up from the interior section 22 (i.e., in use, the outbound section 24 would extend in a direction toward the energy absorber), while the inbound section 26 can extend down from the interior section 22 to an optional attachment section 28 (i.e., the inbound portion 26 extends in a direction away from the bumper beam). In other words, the outboard portion 24 can extend at a positive angle $\alpha_1$, while the inbound portion 26 can extend at a negative angle $\alpha_3$ from the interior section 22.

Figure 4:
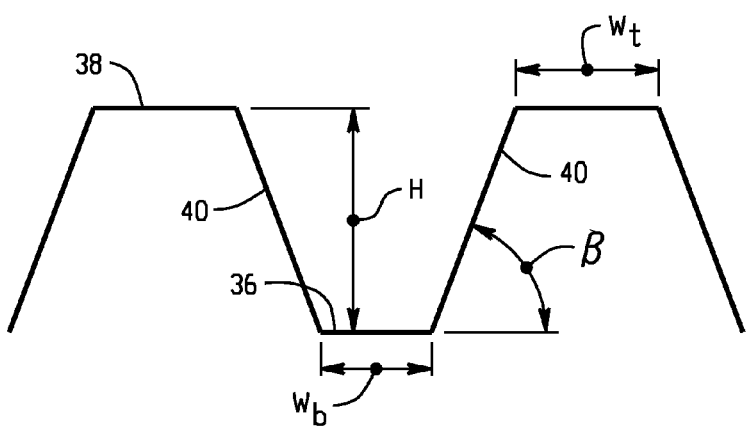
FIG. 4 is an expanded cross-sectional view of the portion of the lower-leg device circled in FIG. 3.
Figure 6:
FIG. 6 is a cross-sectional view of another embodiment of a lower-leg device taken in the same direction of lines A-A.
Figure 7:
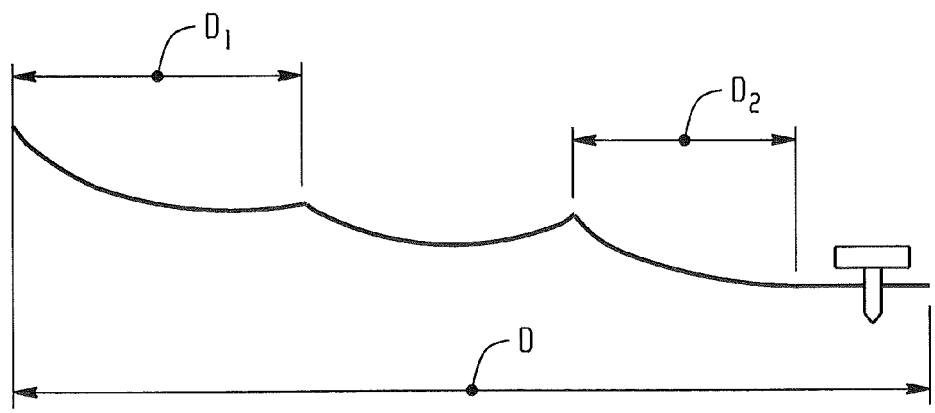
FIG. 7 is a cross-sectional view of another embodiment of a lower-leg device taken in the same direction of lines B-B, along the impact direction.

Similarly, FIGS. 6 and 7 are cross-sectional views of another lower-leg device taken along the same direction as lines A-A and B-B respectively. As can be seen from FIGS. 3 and 6, the design of the corrugations across the lower-leg device can be adjusted to attain a desired airflow and stiffness. Hence, the height of the waffle "H", as well as the angle of the inclination "β" and/or the width "W" of the waffle base and/or top, can be adjusted depending upon the desired airflow and stiffness. (See FIG. 4) In some embodiments, the height "H" can be less than or equal to 100 millimeters (mm), specifically, 5 mm to 50 mm, and more specifically, 10 mm to 20 mm. In other embodiments, the height "H" can be less than or equal to 50 mm, specifically, 5 mm to 30 mm, and more specifically, 10 mm to 20 mm. In some embodiments, the angle "β" can be 0 degrees (deg) to 90 deg, specifically, 10 deg to 85 deg, more specifically, 30 deg to 80 deg, and yet more specifically, 60 deg to 80 deg. In some embodiments, the base width "$W_b$" can be less than or equal to 100 mm, specifically, 20 mm to 100 mm, and more specifically, 50 mm to 70 mm. In some embodiments, the top width "$W_t$" can be less than or equal to 100 mm, specifically, 15 mm to 100 mm, and more specifically, 30 mm to 50 mm. In various embodiments, the base width "$W_b$" and the top width "$W_t$" are equal.

Similarly, as can be seen from FIGS. 5 and 7, the specific shape in the impact direction can be adjusted to attain the desired spring effect. As with the height and inclination, the angles $\alpha_1$ and $\alpha_2$, as well as the lengths $D_1$ and $D_2$ can be varied, depending upon the desired spring action and vehicle design (e.g., packaging space). Hence the stiffness and movement of the lower-leg protector along the impact direction can be varied. The design shown in FIGS. 3-5 allows the flexibility to change various angles, corrugation levels, height, and the thickness along the width of the beam and also along the impact direction. The radius of curvature of the profile can also be varied thereby achieving different curved designs (e.g., see FIG. 7). In these designs, the outbound portion, interior section, and/or inbound portion can be curved. For example, the outbound portion and inbound portion could be straight, while the interior section can be curved. In another embodiment, the outbound portion and the interior section can be straight, while the inbound portion can be curved. The curvature of the curve can be circular, elliptical, parabolic, cubic (e.g., a curve represented by a using a third order polynomial) and combination comprising at least one of the foregoing, to enable a desired crush characteristic.

Figure 8:
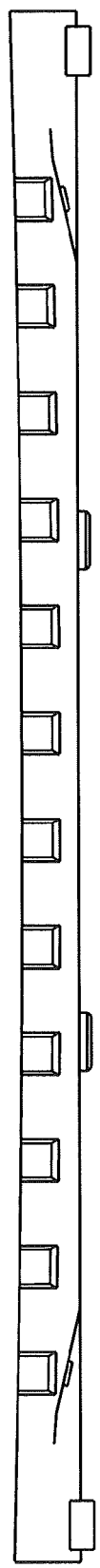
FIG. 8 is a front view of another embodiment of a lower-leg device, e.g., for use close to the ground.
Figure 9:
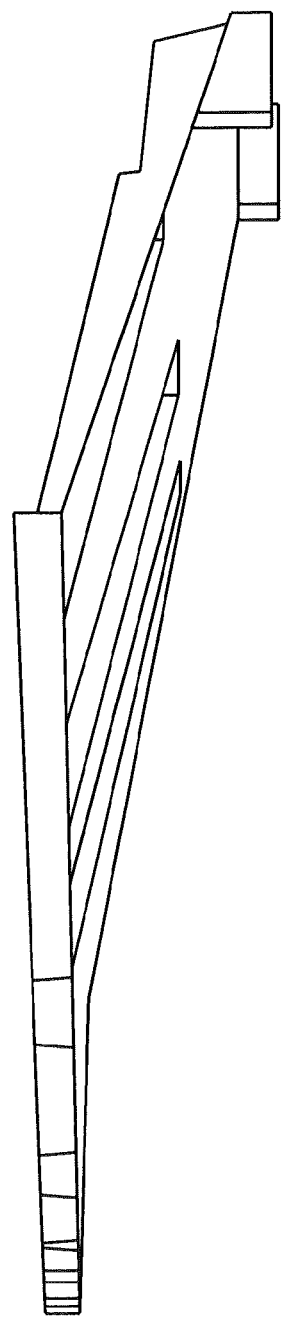
FIG. 9 is a left view of the lower-leg device of FIG. 8.

In a case where the lower-leg protector is to be positioned very close to the ground, desired lower-leg impact performance can be achieved if the lower-leg protector is very stiff, i.e. the lower leg protector acts a rigid body undergoing negligible deformation (less than 5 mm with $\beta$ between 85 mm and 90 mm, $\alpha_1$ and $\alpha_2$ of less than 5 deg (e.g., 1 to 5 deg), "H" of 30 mm, and $W_b$ and $W_t$ being equal) and thereby providing the necessary kick back to the leg to reduce the bending of the knee. In those cases, the corrugation angle, $\beta$, can be maintained to the maximum possible values (e.g., 80 deg. to 90 deg., specifically, 83 to 85 deg). Also, the profile of the lower-leg protector can be maintained as straight as possible to maximize the strength to weight ratio. These designs can have a "H value" of less than or equal to 30 mm, specifically, less than or equal to 20 mm, and more specifically, 5 mm to 20 mm, and yet more specifically, 5 mm to 15 mm. In some embodiments, $\beta$ values can be about 80 to 85 deg. Also, in some embodiments, $\alpha_1$ and $\alpha_2$ can, independently be less than or equal to 3 deg, specifically, less than or equal to 2 deg. One exemplary design of a lower-leg device for use close to the ground is illustrated in FIGS. 8 and 9.

Figure 10:
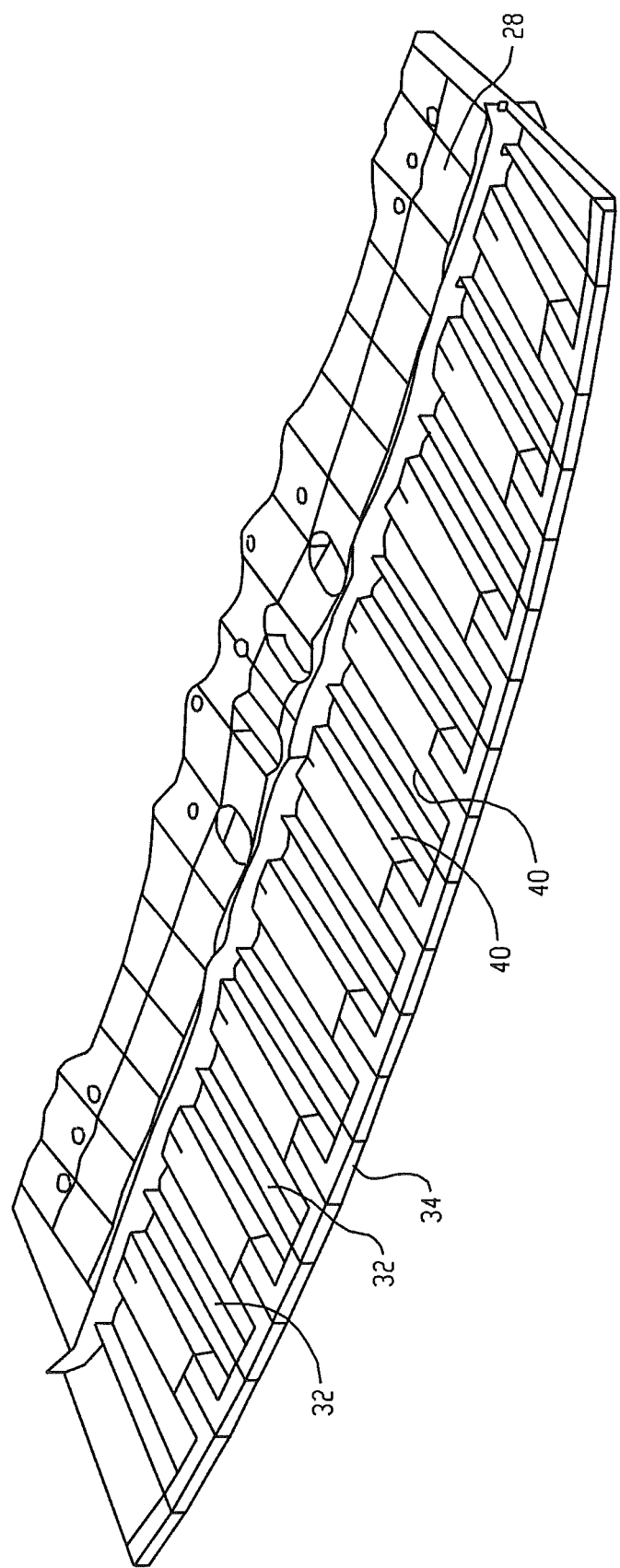
FIG. 10 is a prospective top view of yet another embodiment of a lower-leg device.

In a case where the lower-leg protector is positioned closer to the bumper beam or the energy absorber, the lower-leg device should undergo maximum movement along the impact direction so that during an impact, the energy absorber crushes completely and thereafter the lower-leg protector pushes the leg back. An exemplary design is illustrated in FIG. 10, wherein the lower-leg device comprises ribs. In this figure, $\alpha_1$ and $\alpha_2$ are zero. As is illustrated, the waffles are relatively wide, e.g., have a base width ($W_b$) of 65 mm to 70 mm, and a top width ($W_t$) of 25 mm to 35 mm. Between the sides 40, along the base 36, are ribs 32 extending from near a first edge (e.g., front edge) 34 to the attachment section 28. The ribs can have a thickness of less than or equal to 3.5 mm, specifically, 1.5 mm to 2.5 mm. Although rib(s) can be used in any embodiment, they are particularly useful in providing further structural integrity when angles $\alpha_1$ and $\alpha_2$ are zero. Also, although one rib is illustrated between the sides 40, more than one rib can be employed (e.g., 2 to 5 ribs). In some embodiments, rib(s) are disposed along some bases, but not along others of the waffle structure (e.g., along alternating bases, or along every second or third base). In other embodiments the bases with the ribs can be dependent upon the location of along the element (e.g., near the ends can have ribs while near the middle can be without ribs.)

During use, the lower-leg protector is attached to the vehicle front end module (e.g., lower beam, radiator support beams, speed lip, and/or any other stiff structure on the bottom half of the vehicle) via fastening members such as bolts, screws, snaps, and so forth, and is located below the bumper beam. The specific location of the lower-leg protector is generally dictated by the overall vehicle aesthetics. Without changing the vehicle look, the lower-leg protector can be located below the bumper beam, as close to the ground as possible without redesigning the fascia. Hence, the lower-leg protector can be located below the bumper beam and can extend forward by a distance that is less than or equal to the forward most point of the energy absorber (see energy absorber 6 in FIG. 1). In some embodiments, the lower-leg protector is located so as to enable the energy absorber to absorb as much energy as possible before a leg would impact the lower-leg protector during an impact. As a result, the lower-leg protector can be located 100 mm to 300 mm from the ground (or 100 mm to 400 mm below the bumper beam), and can extend a distance (distance between beam front face to lower leg protector front face) that is greater than or equal to 40% of the depth ("d") of the energy absorber (see FIG. 1), specifically greater than or equal to 50% of "d", more specifically, 50% to 150% of "d", and yet more specifically, 120% of "d".

These lower-leg devices can be formed in various fashions, including molding (e.g., injection molding). Once formed, the device can be installed on a vehicle, below the bumper beam, and covered by a fascia. Hence, a bumper system can comprise an energy absorber (e.g., a unitary energy absorber with sufficient structural integrity to attach directly to the vehicle structure (e.g., the rails), or an energy absorber that is disposed in front of a bumper beam), a lower-leg device disposed beneath the energy absorber, with a fascia covering the energy absorber and lower-leg device.

The lower-leg device is further illustrated by the following non-limiting examples. It is noted that all of the examples were simulations.

EXAMPLES

Example 1

Lower Leg Impact Performance

Figure 11:
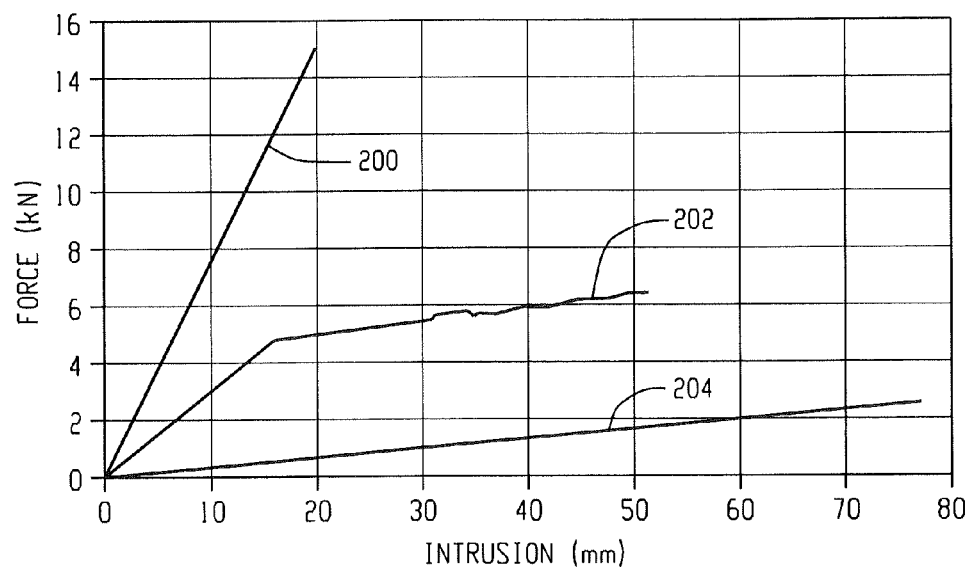
FIG. 11 is a graphical representation of force to the ankle area of a metal spoiler, plastic sheet, and the lower-leg device; force (kN) vs. intrusion (mm).

FIG. 11 compares the thermoplastic lower-leg device with other designs such as a steel spoiler and a plastic sheet (conventional undercover to prevent stone chipping). As it is shown, metal spoilers generate high force with minimum deflection (Line 200), a simple plastic sheet generates very low force with a large stroke and no spring back effect (Line 204). Meanwhile, a thermoplastic lower-leg device is capable of generating controlled force levels by undergoing the desired deflection along the direction of impact (Line 202). This is extremely important and would be very helpful for vehicle to meet the pedestrian safety regulations with Flex-Pli leg impactor where the force and the stain levels are measured throughout the leg model and not only at the knee location.

In this example, simulations were carried out on a generic vehicle with a curved polypropylene fascia, grille, a polycarbonate glass skin for the headlamp, a 25 pounds per square inch (psi) steel as the outer bonnet and a 2 mm thick steel spoiler as the lower-leg protector. The energy absorber material was Xenoy® resin (a PC/PBT blend commercially available from SABIC Innovative Plastics, Pittsfield, Mass.) and the average thickness was maintained as 2.2 mm. The complete length of the assembly was maintained at 1,200 mm, width of 100 mm, and a height of 100 mm. Pedestrian leg form was allowed to hit this vehicle with velocities 40 kmph.

Example 2

Leg Kinematics

Figure 12:
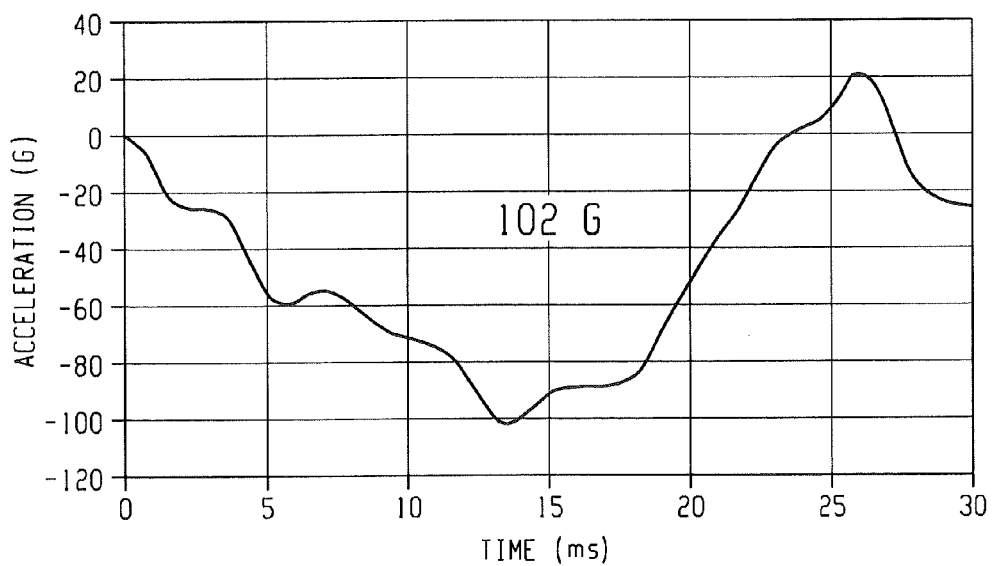
FIG. 12 is a graphical representation of force to the knee: acceleration (G) versus time.
Figure 13:
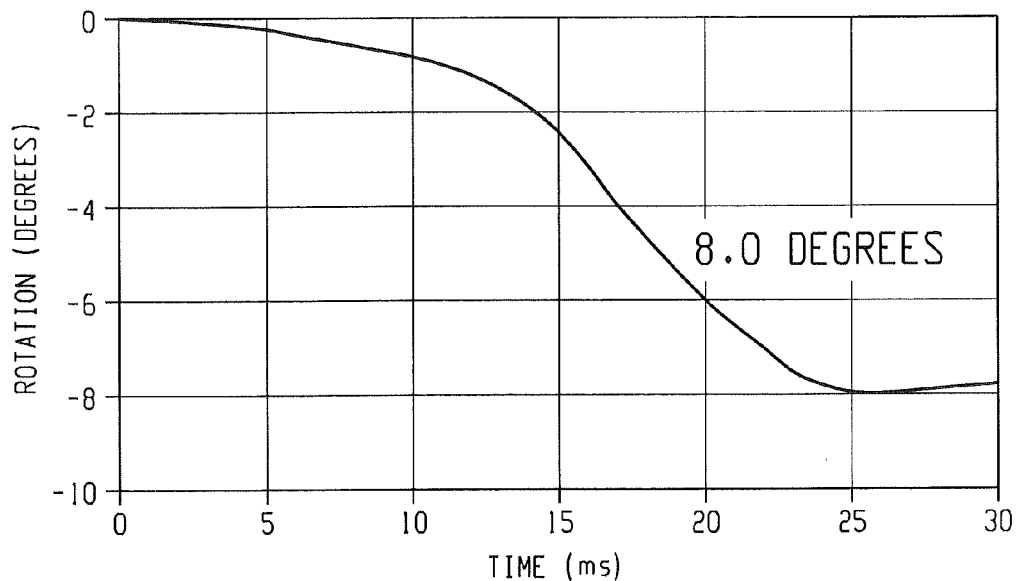
FIG. 13 is a graphical representation of force to the knee: rotation (deg) versus time.
Figure 14:
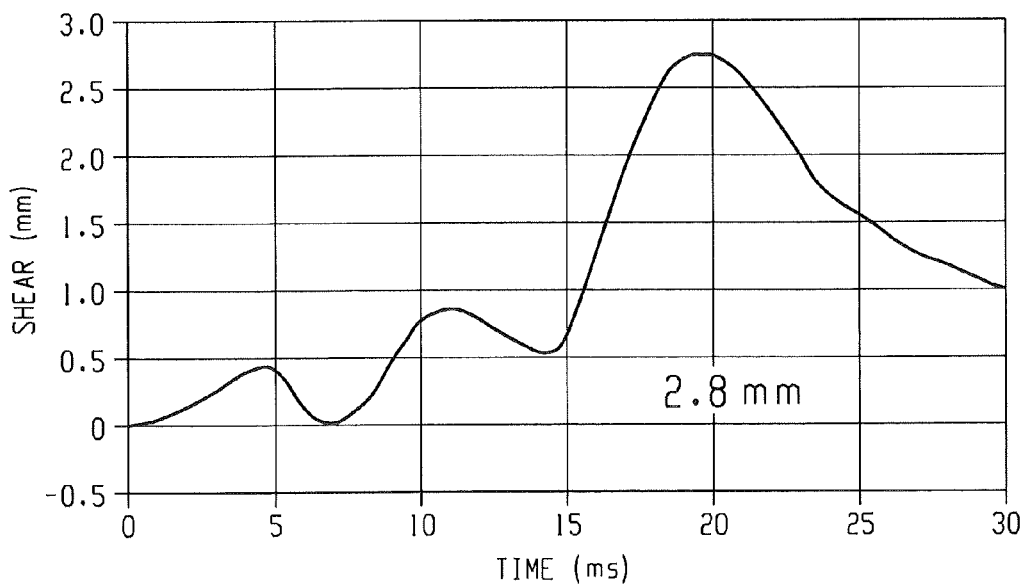
FIG. 14 is a graphical representation of force to the knee: shear (mm) versus time.
Figure 15:
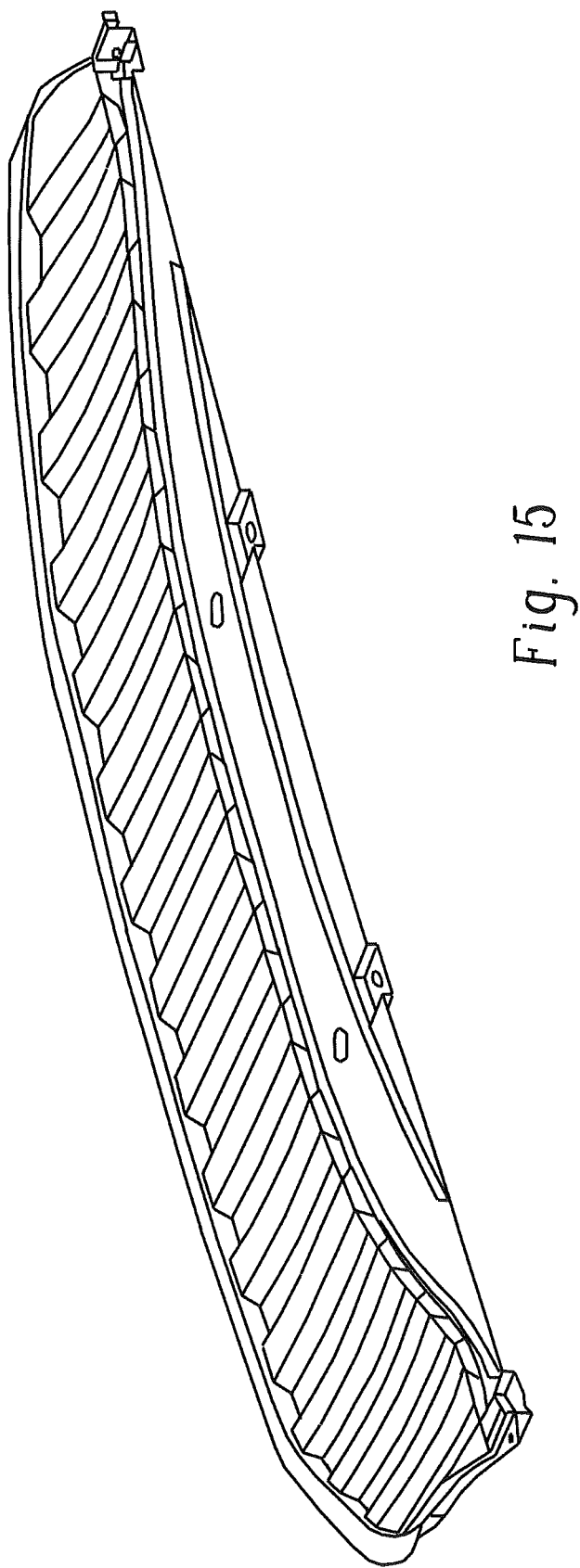
FIG. 15 is a prospective top view a lower-leg device used in the simulations for the data of FIGS. 12-14.

FIGS. 12-14 show the leg kinematics attained using the design illustrated in FIG. 15 when subjected to lower-leg pedestrian impact. A generic vehicle platform with a 3 millimeter (mm) thick polypropylene (PP) fascia, a glass filled lower spoiler, and a stiff member on the top to emulate the hood are used in conjunction with a thermoplastic energy absorber formed from Xenoy® resin. The lower-leg device is found to meet all the lower-leg impact targets as per phase II protocols: acceleration of less than 150 G (102 G was attained), rotation of less than 15 deg (8.0 deg was attained), and Shear less than 6 mm (2.8 mm was attained).

Hence, with the present lower-leg device acceleration of less than or equal to 130 G can be attained, specifically, less than or equal to 120 G, and even less than or equal to 110 G. Also possible with the present designs is a rotation of less than or equal to 12 deg, specifically, less than or equal to 10 deg. Similarly attainable with the present designs are shear values of less than or equal to 4 mm, and even less than or equal to 3 mm. In other words, the present designs allow an acceleration of less than or equal to 130 G, a rotation of less than or equal to 12 deg, and a shear of less than or equal to 4 mm.

Example 3

Figure 16:
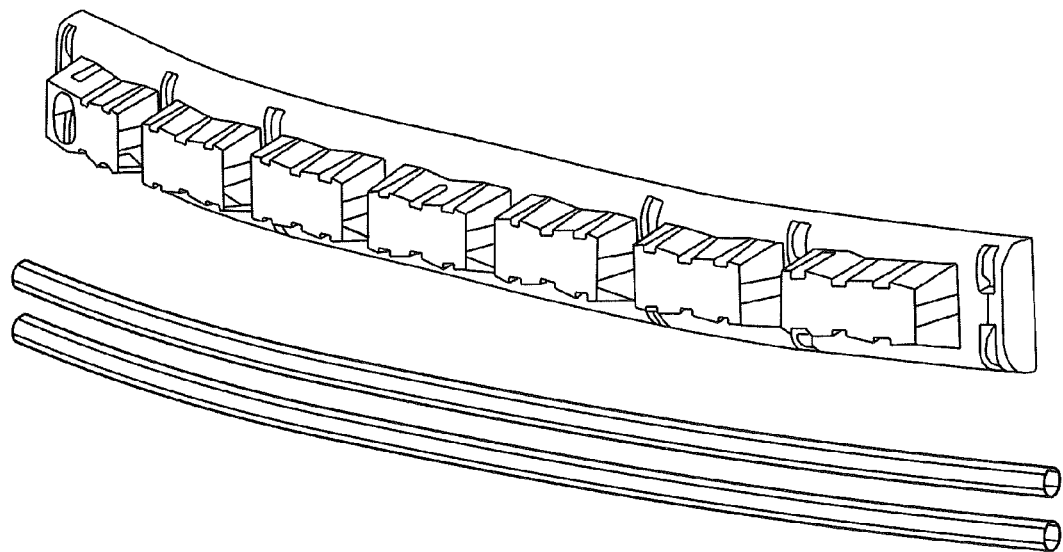
FIG. 16 is a representation of a thermoplastic energy absorber and steel spoiler.
Figure 17:
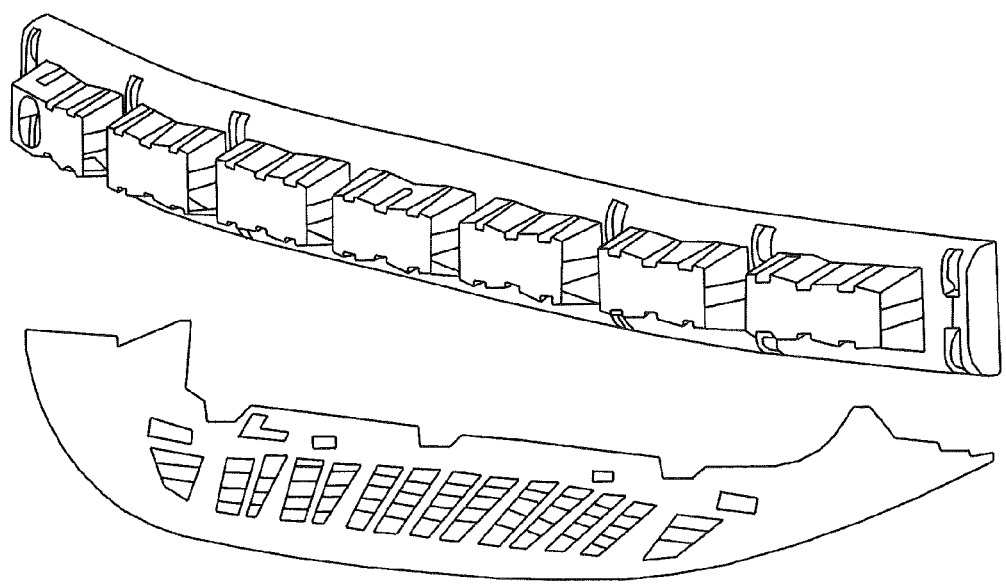
FIG. 17 is a representation of the same thermoplastic energy absorber of FIG. 16 with a thermoplastic lower-leg device.
Figure 18:
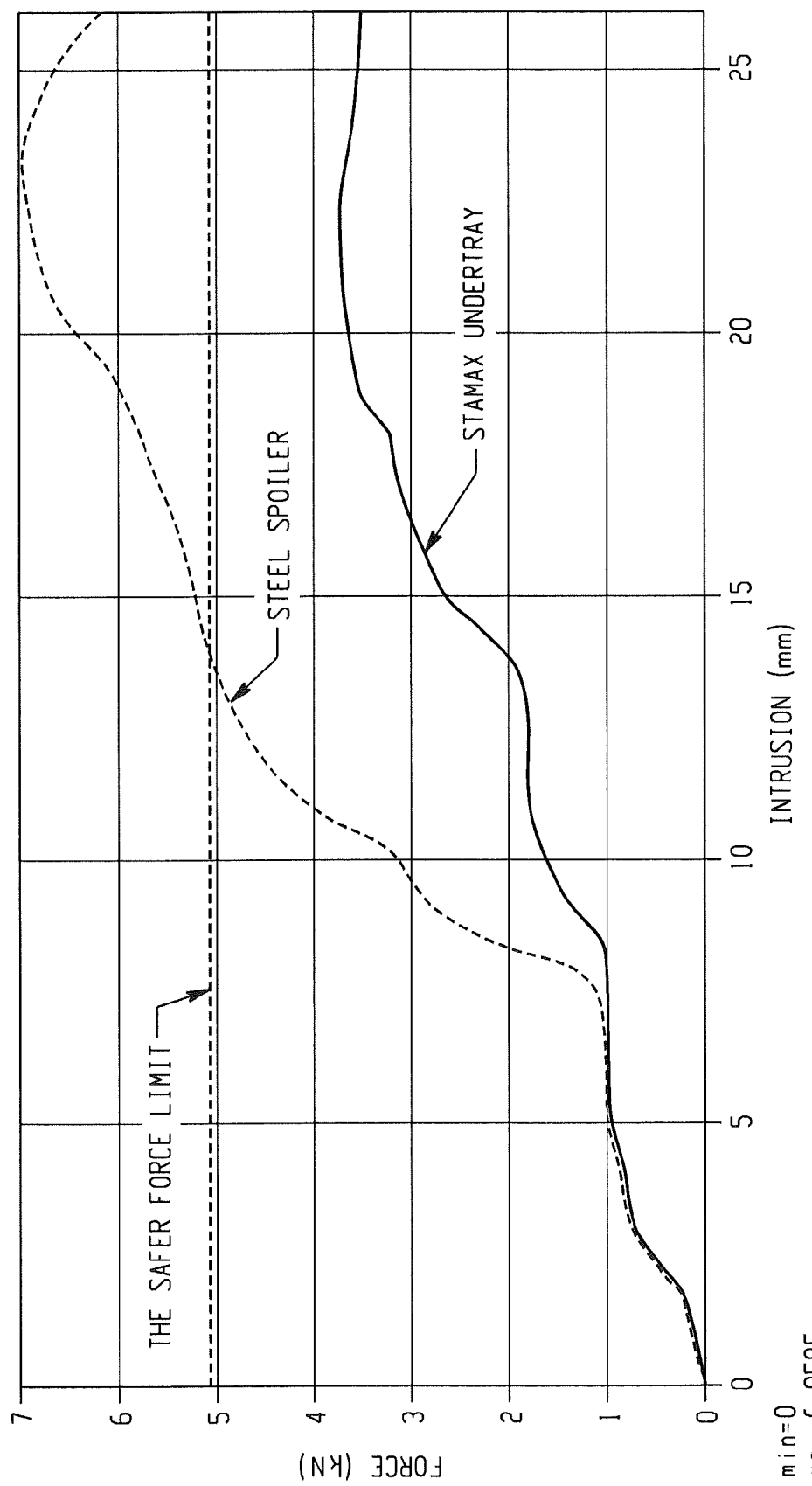
FIG. 18 is a graphic illustration of the lower load path for an impact on the system of FIG. 16 versus the system of FIG. 17.

In this example, a system comprising a thermoplastic energy absorber formed from Xenoy® resin with a steel spoiler (FIG. 16) was compared to a system comprising the same thermoplastic energy absorber, but with a thermoplastic lower-leg device formed from Stamax® resin (commercially available from SABIC Innovative Plastics IP B.V.) (FIG. 17). The two designs were compared for the force on the lower leg. As is illustrated in FIG. 18, the force (kN) versus intrusion (mm) for the design of FIG. 17 was much lower than that of FIG. 16.

Hence, as can be seen from the figure, various embodiments of the current design can maintain an acceptable force limit for an intrusion exceeding 25 mm (until the end of the impact), while the steel spoiler design exceeds a save force limit at an intrusion of 15 mm. Actually, at an intrusion of 15 mm, the present design can have a force of less than or equal to 4 kN, specifically, less than 3 kN, and can even maintain a force of less than or equal to 4 kN at an intrusion of 22.5 mm. At an intrusion of 22.5 mm, the system comprising the steel spoiler had a force of nearly 7 kN; nearly twice the force of the design of FIG. 17.

Some of the advantages of the thermoplastic lower-leg devices disclosed herein include: lightweight compared to steel/ETP spoilers (e.g., for the same vehicle, a weight savings of 30 to 60%), compliant with upcoming Flexible leg impact requirements, can provide air guides as intake to radiator/cooling tower, can serve as a shield for debris (e.g., stone chipping), and can eliminate the need of an undercover. In other words, with the present design, Flexible leg impact requirements are met, and the need for a separate undercover is eliminated.

Thermoplastic lower-leg protectors also allow the user to tune the stiffness along the width of the vehicle and provide necessary spring back effect with the help of which the leg can be pushed back, thereby reducing the damage to the pedestrian knee during an impact.

In an embodiment, a thermoplastic lower-leg device can comprise: corrugations in a direction perpendicular to an impact direction; and an interior section extending in the impact direction and having an outbound portion having an outbound length $D_1$ extending at an angle, $\alpha_1$, from the interior section and an inbound portion having an inbound length, $D_2$, extending in a direction opposite the outbound portion at an angle, $\alpha_2$, from the interior section.

In an embodiment, a vehicle can comprise: a radiator; an engine compartment; an energy absorbing system comprising an energy absorber having crush lobes; a lower-leg device comprising: corrugations in a direction perpendicular to an impact direction; and an interior section extending in the impact direction and having an outbound portion having an outbound length $D_1$ extending at an angle, $\alpha_1$, from the interior section and an inbound portion having an inbound length, $D_2$, extending in a direction opposite the outbound portion at an angle, $\alpha_2$, from the interior section; and a fascia over the energy absorbing system and the lower-leg device.

In the various embodiments: (i) the angle $\alpha_1$ is greater than zero and less than 90 degrees; and/or (ii) the angle $\alpha_2$ is greater than zero and less than 90 degrees; and/or (iii) the outbound portion extends straight from the interior section which extends straight from the inbound portion; and/or (iv) the corrugations have a height "H" of less than or equal to 100 mm; and/or (v) the height "H" is 5 mm to 50 mm; and/or (vi) the corrugations have an angle "β" of 10 deg to 85 deg; and/or (vii) the angle "β" is 30 deg to 80 deg; and/or (viii) the corrugations have a base width "$W_b$" of less than or equal to 100 mm, and have a top width "$W_t$" of less than or equal to 100 mm; and/or (ix) the base width "$W_b$" is 20 mm to 100 mm and the top width "$W_t$" is 15 mm to 100 mm; and/or (x) the base width "$W_b$" equals the top width "$W_t$"; and/or (xi) the corrugations have a base, and wherein a rib extends in the impact direction along the base from near a front edge toward an attachment section; and/or (xii) the vehicle further comprises a bumper beam, wherein the energy absorber extends across the bumper beam between the bumper beam and the fascia; and/or (xiii) a horizontal distance between the bumper beam and the outbound portion is less than a horizontal distance between the bumper beam and the inbound portion; and/or (xiv) the lower-leg device is a barrier to debris from entering the engine compartment; and/or (xv) angle, $\alpha_1$ and angle $\alpha_2$ equal zero.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combination" is inclusive of blends, mixtures, alloys, reaction products, and the like. Furthermore, the terms "first," "second," and the like, herein do not denote any order, quantity, or importance, but rather are used to d one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A thermoplastic lower-leg device, comprising:
corrugations in a direction perpendicular to an impact direction, wherein the corrugations have an angle "β" of 10 deg to 85 deg; and
an interior section extending in the impact direction and having an outbound portion having an outbound length $D_1$ extending at an angle, $\alpha_1$, from the interior section and an inbound portion having an inbound length, $D_2$, extending in a direction opposite the outbound portion at an angle, $\alpha_2$, from the interior section;
wherein the device is configured to attach to a vehicle;
wherein the angle $\alpha_1$ is greater than zero and less than 90 degrees; and
wherein the angle $\alpha_2$ is greater than zero and less than 90 degrees.

2. The device of claim 1, wherein the outbound portion extends straight from the interior section which extends straight from the inbound portion.

3. The device of claim 1, wherein the corrugations have a height "H" of less than or equal to 100 mm.

4. The device of claim 3, wherein the height "H" is 5 mm to 50 mm.

5. The device of claim 1, wherein the angle "β" is 30 deg to 80 deg.

6. The device of claim 1, wherein the corrugations have a base width "$W_b$" of less than or equal to 100 mm, and have a top width "$W_t$" of less than or equal to 100 mm.

7. The device of claim 6, wherein the base width "$W_b$" is 20 mm to 100 mm and the top width "$W_t$" is 15 mm to 100 mm.

8. The device of claim 6, wherein the base width "$W_b$" equals the top width "$W_t$".

9. The device of claim 1, where the corrugations have a base, and wherein a rib extends in the impact direction along the base from near a front edge toward an attachment section.

10. A vehicle comprising:
a radiator;
an engine compartment;
an energy absorbing system comprising an energy absorber having crush lobes;
a lower-leg device comprising:
corrugations in a direction perpendicular to an impact direction wherein the corrugations have an angle "β" of 10 deg to 85 deg; and
an interior section extending in the impact direction and having an outbound portion having an outbound length $D_1$ extending at an angle, $\alpha_1$, from the interior section and an inbound portion having an inbound length, $D_2$, extending in a direction opposite the outbound portion at an angle, $\alpha_2$, from the interior section;
wherein the angle $\alpha_1$ is greater than zero and less than 90 degrees; and
wherein the angle $\alpha_2$ is greater than zero and less than 90 degrees; and
a fascia over the energy absorbing system and the lower-leg device.

11. The vehicle of claim 10, further comprising a bumper beam, wherein the energy absorber extends across the bumper beam between the bumper beam and the fascia.

12. The vehicle of claim 10, wherein a horizontal distance between the bumper beam and the outbound portion is less than a horizontal distance between the bumper beam and the inbound portion.

13. The vehicle of claim 10, wherein the lower-leg device is a barrier to debris from entering the engine compartment.

14. The device of claim 1, wherein the device is configured to attach to a vehicle front end module.

15. The device of claim 14, further comprising fastening members for attaching the device to the vehicle front end module.

16. The device of claim 15, wherein the device is configured to attach to the vehicle front end module below a bumper beam and to extend a distance from the vehicle that is less than or equal to a forward most point of an energy absorber.

17. The device of claim 1, where the outbound portion, interior section, and/or inbound portion are curved.

18. The device of claim 1, wherein during an impact, the device enables a spring back effect by deflection along the impact direction.

19. A thermoplastic lower-leg device, comprising:
corrugations in a direction perpendicular to an impact direction, wherein the corrugations have an angle "β"; and
an interior section extending in the impact direction and having an outbound portion having an outbound length $D_1$ extending at an angle, $\alpha_1$, from the interior section and an inbound portion having an inbound length, $D_2$, extending in a direction opposite the outbound portion at an angle, $\alpha_2$, from the interior section;
wherein the device is configured to attach to a vehicle;
wherein angle "β", angle $\alpha_1$, and angle $\alpha_2$ is greater than zero and less than 90 degrees.

* * * * *